Patented June 1, 1954

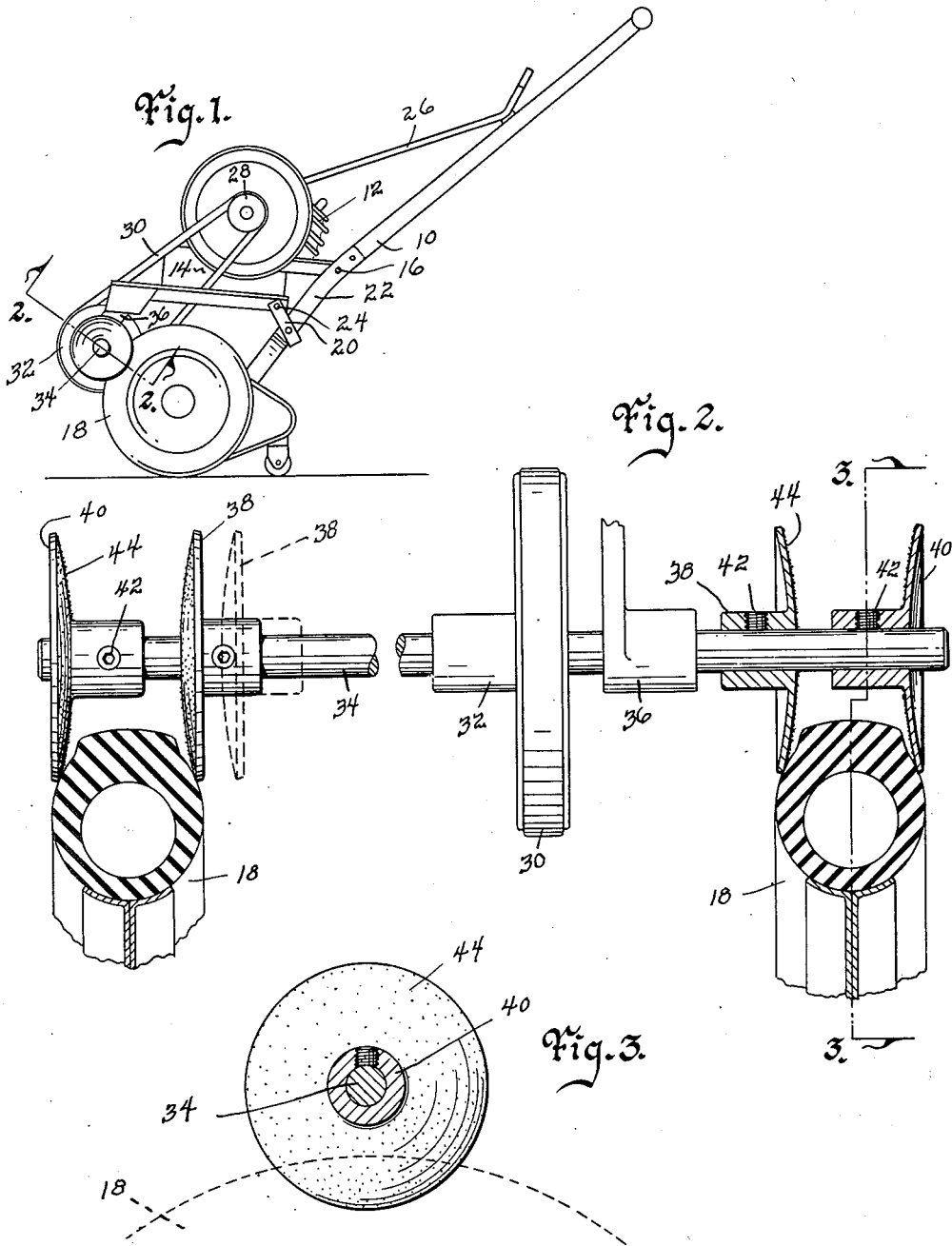

2,679,761

UNITED STATES PATENT OFFICE 2,679,761

MOWER DRIVE

George Pedersen, Kensett, Iowa

Application June 21, 1952, Serial No. 294,772

2 Claims. (Cl. 74—213)

My invention relates to lawn mowers and specifically is a novel and improved connection between the source of power such as an engine and the mower mechanism.

Power lawn mowers have been known for a long time. Until rather recently however, they have been confined largely to mowers for establishments that have extensive lawns and that would have required vast expenditure for labor to keep them mowed. Institutions such as schools with their athletic field, cemeteries, and golf clubs, are all good examples of groups having very large lawn areas. Power lawn mowers for private use have been gradually increasing in popularity, however, and within the last decade have become so numerous as to constitute a serious threat to the old hand mower. Many prefer not to discard perfectly good hand mowers for new power machines, furthermore, and yet would much prefer the conveniences of power mowing. Consequently, there has been some tendency for manufacturers to provide engines or motors that are adapted to being mounted on hand mowers to convert them to power. Most of these conversion units require special reworking of the hand mower to adapt the wheels of the mower to chain drives and the like. Many of these conversion kits are of such a nature that the connection or disconnection of the mower from the power unit is a rather substantial undertaking. Consequently once the power unit has been secured to the machine to convert it to power, there is little or no inclination to disconnect the unit unless it is absolutely necessary. Furthermore, when it is necessary to remove the engine as when the lawn mower is being sharpened, considerable expense is involved merely in preparing the machine for sharpening. In fact in many cases the labor involved in preparing the device for sharpening is the major cost involved in that particular maintenance procedure. The primary reason for difficult mounting lies in the customary use of chains and cogs for the drive. Although other systems of connecting the engine to the wheels have been tried, the vast majority of the mowers use the chain cog drive. I assume this wide acceptance of the chain and cog has been its generally more acceptable operation in spite of the difficulties involved in mounting and dismounting it. Attempts to drive lawn mowers with the concave roller commonly used as a drive on powered bicycles has not developed into wide-spread usage. From personal experience I believe this failure comes from the difficulty of obtaining sufficient traction from such a roller on the mower tire tread.

Another major problem of power mowers which does not particularly bother the usual operator owner but which is an unnecessary drain on our natural recourses is the necessity for providing more engine power than is necessary for usual work. Many mowers have engines vastly larger and more powerful than is necessary for the usual mowing job in order to have sufficient power to mow well under extraordinary conditions. This excess power is required, because the usual machine has a fixed gear ratio between the engine and mower at least for all practical purposes. It is not possible to increase the amount of force applied to the mower by reducing its speed and increasing its power through a change in gear ratio. The need for extra power is readily seen, therefore, as far as the conventional mower goes. The mere over-powering of the machine would not be serious, however, were it not for the fact that there is only one speed at which an engine can operate most economically. If the variations of speed and power could be obtained by gear ratio while the engine is permitted to run at its most economical speed, much hydro-carbon fuel could be saved for the country generally.

In view of the foregoing, therefore, it is the principal object of my invention to provide a drive for hand mower conversion kits that permit mounting and dismounting of the motor or engine very readily.

It is a further object of my invention to provide a mower drive that reduces the amount of labor involved in preparing the reel for sharpening.

It is a still further object of my invention to provide a mower drive that permits a mower to be operated with the minimum size of power plant.

It is a still further object of my invention to provide a mower drive that permits the engine of a converted mower to be operated at its most economical speed regardless of power requirements.

It is a still further object of my invention to provide a mower drive that is very inexpensive to manufacture and maintain by reason of its very simple construction.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a reduced side elevation view of my drive mounted on a lawn mower.

Fig. 2 is a partial cross-sectional and partial front elevation view of my drive. Broken lines illustrate an adjusted position of one of the pulley halves and a portion of the drive shaft is broken away to conserve space. The cross-sectional portions of the illustration are taken on the line 2—2 of Fig. 1.

Fig. 3 is a side elevation view of a single pulley element taken on the line 3—3 of Fig. 2 and with broken lines illustrating a relative position of the mower wheel to the pulley when the engine and mower are engaged.

Referring to the drawings I have used the numeral 10 to designate an ordinary lawn mower. An engine designated 12 is mounted on a platform 14 which is hingedly secured to the mower at 16. A pair of identical stops serve to limit the pressure exerted on the pulley drive in reference to the tires 18 of the mower. Only one of these stops is visible in Fig. 1 and it is designated 20. As the two stops are identical, this showing of a single one is sufficient to disclose a workable machine. The stops engage the tops of the strap irons that form the yoke 27 of the mower and which serve to connect the centrally located handle to both sides of the mower. These stops are adjustable for a reason which will appear more fully below. This adjustment may be made by securing the stop to the frame with a bolt as at 24.

Lever 26 serves to hingedly move the platform on its pivot 16. A V-pulley 28 on the engine 12 has an ordinary V-belt 30 reeved over it and a similar usual V-pulley 32. The V-pulley is rigidly secured to the drive shaft 34 which is suitably journalled in a pair of bearings 36. Only one of these bearings is shown to conserve space but each end portion of the shaft has a bearing near it. These bearings are adjustably secured to the platform 14 in any conventional manner in order to permit the tension on belt 30 to be properly adjusted. The most novel portion of my structure are the adjustable V-pulleys which engage the wheels 18. They are each composed of a matched pair of halves consisting of an inside unit 38 and an outside unit 40. Some suitable form of device is used to secure the halves to the shaft such as Allen head set screws 42 which permits the halves to be moved along the shaft or rigidly secured to the shaft during operation of the device. It will be noticed that the collar of the outside unit extends away from the convex side of the pulley half secured to it and that exactly the opposite is true of the inside unit. This collar side arrangement permits the use of long, strong collars without necessitating the use of an extra long shaft. Although I have made successfully operating machines using smooth faced all steel pulleys, I prefer to provide the pulleys with a roughened rubber face as at 44 to insure a high degree of frictional resistance to slippage between the pulley faces and the tires 18.

The operation of my device is very simple. The split pulleys are adjusted to engage the wheels for proper power requirements in view of the mowing job to be done and the engine started with the split pulleys held away from the wheels by hingedly moving the engine stand up with lever 26. If the grass is long or tough, the pulleys are adjusted to be relatively close together so that they engage the tires 18 near the perimeter of the wheel where the greatest leverage is obtained. If the mowing job is not a difficult one, less power and more speed can be obtained by spreading the halves of split pulley so that the wheel tires are engaged at a point nearer to the axle of the machine. After the pulleys have been properly adjusted and the engine started, lever 26 is gradually moved to lower the platform 14 so that pulleys gradually engage the tires of the wheels 18. The power of the engine is then connected to the mower wheels and substantially without slippage since the entire weight of the engine may be allowed to bear on the drive pulleys if desired. Since different adjustment of pulley widths would require different positions of the stops, they are adjustable by pivoting action about the securing bolt 24 when this bolt is loosened. It is also possible to set the stop for maximum speed and minimum power merely to insure that the split pulley will not drop to the wheel center regardless of pulley setting. At all adjustments except for maximum speed, the entire weight of the engine would bear on the pulleys. As the gear ratio between the wheels and the power plant may be altered, the engine may be of size that is relatively low powered and will still answer a wide variety of mowing problems. Likewise the engine may be run at its best speed regardless of power or speed requirements for the mower. Consequently a power plant of modest size will serve very well.

As is clear from the description and drawings, the engine and drive can be removed from the hand mower quickly and easily. Sharpening the reel and bar present little in the way of difficulties for the maintenance man, therefore, as far as preparing the machine for sharpening. Furthermore, the device can be readily converted for hand use if that should prove either necessary or desirable. The structure which makes all these advantages possible is my split pulley drive. Obviously this drive in combination with a hand mower conversion kit presents many advantages that would not be apparent to many. Furthermore, numerous advantages may even be seen that cannot be achieved by other structures and particularly not by regular power mowers.

I have shown the drive used with a rubber-tired mower in which the sides of the tires bulge. When the V-pulleys are opened, therefore, a point on the tire nearer to the mower axle is engaged. If my drive were used with a mower having straight sided tires, the widening of the V-pulleys would cause a point on the pulley faces near to the shaft to engage the outside of the wheel. In such a situation spreading the pulley halves would affect the gear ratio between the engine and the mower in exactly the opposite manner to that described above. The gear ratio could be controlled, nevertheless.

Some changes may be made in the construction and arrangement of my mower drive without departing from the real spirit and purpose of my invention, and it is my intention to cover by my claims, any modified forms of structure or use of mechanical equivalents which may be reasonably included within their scope.

I claim:

1. In a drive for connecting a source of power to a lawn mower, a bearing adapted to being moveably mounted on a lawn mower, a shaft rotatably supported in said bearing, at least one split V-pulley on said shaft; said pulley comprising two separate halves, each half comprising a collar and a concavo-convex disc; one of said halves having the collar extending from the concave side of one of said discs and the other of said halves having the collar extending from the convex side of the other of said discs.

2. In combination a lawn mower, a bearing hingedly secured to said lawn mower; said bearing hingedly moving to and from said lawn mower wheels, a shaft journalled in said bearing, a split V-pulley secured to said shaft; said split pulley comprising two halves each comprising a collar embracing said shaft and a concavo-convex disc secured to said collar; one of said collars extending from the concave side of its associated disc, and the other of said collars extending from the convex side of its associated disc, and means on said shaft to connect said shaft to a source of power for rotating said shaft.

References Cited in the file of this patent

UNITED STATES PATENTS

| Number | Name | Date |
|---|---|---|
| 1,578,525 | Ireland | Mar. 30, 1926 |
| 2,142,730 | Kohl | Jan. 3, 1939 |
| 2,514,857 | Gottbreht | July 11, 1950 |

FOREIGN PATENTS

| Number | Country | Date |
|---|---|---|
| 802,980 | Germany | Feb. 26, 1951 |
| 834,486 | Germany | Mar. 20, 1952 |
| 65,981 | Netherlands | June 15, 1950 |
| 260,690 | Switzerland | Aug. 1, 1949 |